US012316050B2

(12) United States Patent
Maier

(10) Patent No.: US 12,316,050 B2
(45) Date of Patent: May 27, 2025

(54) ELECTRICAL PLUG-IN CONNECTION AND CLAMPING DEVICE FOR AN ELECTRICAL PLUG-IN CONNECTION

(71) Applicant: Rosenberger Hochfrequenztechnik GmbH & Co. KG, Fridolfing (DE)

(72) Inventor: Christian Maier, Griesstaett (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 374 days.

(21) Appl. No.: 17/785,303

(22) PCT Filed: Dec. 17, 2020

(86) PCT No.: PCT/EP2020/086792
§ 371 (c)(1),
(2) Date: Jun. 14, 2022

(87) PCT Pub. No.: WO2021/123006
PCT Pub. Date: Jun. 24, 2021

(65) Prior Publication Data

US 2023/0018161 A1 Jan. 19, 2023

(30) Foreign Application Priority Data

Dec. 20, 2019 (DE) ..................... 10 2019 135 541.9
Jan. 13, 2020 (DE) ..................... 10 2020 100 533.4

(51) Int. Cl.
*H01R 13/639* (2006.01)
*H01R 13/627* (2006.01)

(52) U.S. Cl.
CPC ....... *H01R 13/639* (2013.01); *H01R 13/6272* (2013.01); *H01R 2201/26* (2013.01)

(58) Field of Classification Search
CPC ................ H01R 13/639; H01R 13/533; H01R 13/6271; H01R 13/6272; H01R 13/6273;
(Continued)

(56) References Cited

U.S. PATENT DOCUMENTS 6,655,979 B1 12/2003 Lee
7,025,610 B2 * 4/2006 Demuth ........... H01R 13/62944
439/372
(Continued)

FOREIGN PATENT DOCUMENTS

DE 202008014541 U1 1/2009
DE 202009007483 U1 10/2010
(Continued)

OTHER PUBLICATIONS

Eberwein C, EP-3010092-B1, English translated abstract (Year: 2020).*
(Continued)

*Primary Examiner* — Abdullah A Riyami
*Assistant Examiner* — Amara Anderson
(74) *Attorney, Agent, or Firm* — Randall Danskin P.S.

(57) ABSTRACT

The invention relates to a clamping device (5) for an electrical plug-in connection (1), which has an electrical plug-in connector (2), an electrical mating plug-in connector (3) that can be electrically and mechanically connected to the plug-in connector (2), and a primary latching arrangement (4) for latching the connection between the plug-in connector (2) and the mating plug-in connector (3). Provision is made for the clamping device (5) to be designed to brace the plug-in connector (2) and the mating plug-in connector (3) relative to one another in a connected state in addition to the latching by way of the primary latching arrangement (4).

21 Claims, 11 Drawing Sheets

(58) Field of Classification Search
CPC .......... H01R 13/6275; H01R 13/62933; H01R 13/62938; H01R 13/62955; H01R 13/631; H01R 2201/26
USPC ........................................................ 439/76.2
See application file for complete search history.

(56) References Cited

U.S. PATENT DOCUMENTS

| | | | | |
|---|---|---|---|---|
| 9,437,953 | B2 | 9/2016 | Lappoehn | |
| 9,979,119 | B2 | 5/2018 | Saur | |
| 10,454,214 | B1 | 10/2019 | Sato | |
| 2013/0029539 | A1* | 1/2013 | Frank | H01R 9/05<br>439/750 |
| 2014/0057468 | A1* | 2/2014 | Temmesfeld | H01R 13/639<br>439/133 |
| 2016/0226186 | A1* | 8/2016 | Griepenstroh | H01R 13/436 |
| 2019/0379162 | A1* | 12/2019 | Motoshige | H01H 9/104 |
| 2020/0388959 | A1* | 12/2020 | Furugoori | H01R 13/7032 |
| 2021/0296820 | A1* | 9/2021 | Gruendler | H01R 13/62938 |
| 2022/0037835 | A1* | 2/2022 | Kliever | H01R 13/6315 |
| 2022/0329008 | A1* | 10/2022 | Hohenadl | H01R 13/641 |

FOREIGN PATENT DOCUMENTS

| | | | | |
|---|---|---|---|---|
| EP | 3010092 | B1 * | 6/2020 | H01R 13/62955 |
| JP | 2020126842 | A | 8/2020 | |

OTHER PUBLICATIONS

German Search Report dated Dec. 15, 2020.
International Search Report dated Mar. 12, 2021.

* cited by examiner

ELECTRICAL PLUG-IN CONNECTION AND CLAMPING DEVICE FOR AN ELECTRICAL PLUG-IN CONNECTION

CROSS-REFERENCE TO RELATED APPLICATIONS

This US National Stage Non-Provisional Patent Application claims priority to earlier filed PCT Patent Application No. PCT/EP2020/086792 which was filed on 17 Dec. 2020 and which was published as WO 2021/123006 A1 on 24 Jun. 2021, and further claims priority to still earlier filed German Patent Application No. 10 2020 100 533.4 which was filed on 13 Jan. 2020 and even still further claims priority to still earlier filed German Patent Application No. 10 2019 135 541.9 which was filed on 20 Dec. 2019.

The entire contents of the aforementioned earlier filed PCT Patent Application and the two earlier filed German Patent Applications are all expressly and fully incorporated herein by this reference.

Pursuant to USPTO rules, this priority claim to earlier filed PCT Patent No. PCT/EP2020/086792 which was filed on 17 Dec. 2020 and which was published as WO 2021/123006 A1 on 24 Jun. 2021, and still earlier filed German Patent Application No. 10 2020 100 533.4 which was filed on 13 Jan. 2020 and even still further claims priority to still earlier filed German Patent Application No. 10 2019 135 541.9 which was filled on 20 Dec. 2019 is also included in the Application Data Sheet (ADS) filed herewith.

FIELD OF INVENTION

The invention relates to a clamping device for an electrical plug-in connection, which has an electrical plug-in connector, a mating electrical plug-in connector and a primary latching arrangement.

The invention also relates to an electrical plug-in connection, having an electrical plug-in connector, a mating electrical plug-in connector, a primary latching arrangement and a clamping device.

BACKGROUND OF THE INVENTION

A clamping device of the generic type is known from EP 3 028 349 B1.

A multiplicity of electrical plug-in connectors is known from electrical engineering. As is known, electrical plug-in connectors are used to transmit electrical supply signals and/or data signals to corresponding mating plug-in connectors. An electrical plug-in connector or a mating electrical plug-in connector can be, and without limitation, a plug, an integral plug, a socket, a coupling or an adapter. The designation "plug-in connector" or "mating plug-in connector" used within the context of the invention is representative of all variants.

As is known, oscillations or vibrations are capable of being transmitted to the plug-in connection via the components connected by the plug-in connectors, for example cables. As a result of the vibrations transmitted to the plug-in connection, it is ultimately possible for abrasion of the contacts of the plug-in connector and of the mating contacts of the mating plug-in connector to occur, which means that the transfer impedance of the plug-in connection can be increased and the service life of the plug-in connection can be reduced. There is therefore a need for plug-in connections which exhibit a high vibration resistance.

High demands with respect to robustness and security are placed in particular on plug-in connectors for the motor vehicle industry. Thus, a plug-in connection for the motor vehicle industry must consequently withstand particularly high mechanical loadings and remain closed in a defined manner. It is necessary to ensure that the electrical connection is not broken unintendedly, for example during the operation of a vehicle. In addition, the plug-in connectors must ensure satisfactory transmission of electrical power and/or data even in contaminated, moist and/or chemically aggressive environments.

In particular, ensuring reliability takes priority during the autonomous operation of vehicles and for assistance systems.

Special requirements are also placed on electrical plug-in connectors in particular in the high voltage range. High voltage plug-in connectors are used in the vehicle sector primarily in electrical and/or hybrid vehicles, in order to supply a vehicle battery with charging current or to remove the stored energy from the battery and supply it to the electric drive. The electrical plug-in connection must permanently and reliably prevent penetration of moisture and contaminants and ensure satisfactory transmission of high currents with a comparatively low transfer impedance.

Added to this is the fact that, in particular in electric vehicles, in addition to the usual loadings, particularly critical vibrations can occur as a result of uneven roads because of floating phenomena which result from the inexact rotational speed synchronization of the electric motors. In the case of a hybrid vehicle, further vibrations can also be added by the internal combustion engine.

To suppress the negative effects of such mechanical vibrations, it is proposed in the generic EP 3 028 349 B1 to stabilize a cable loom plug relative to an interface socket of a unit or of an electric motor mechanically. To this end, in addition to its primary fixing to the socket, the plug is further fixed by a second fixing means on the outer housing of the unit or electric motor itself to which the socket is also secured. The vibrations of the unit or electric motor thus act uniformly on the plug and the socket in the best case, which means that, as a rule, a relative movement between the plug and the socket no longer takes place.

However, in practice the solution proposed in EP 3 028 349 B1 is not able to suppress the relative movement between the plug and the socket completely and possibly also adequately. In addition, first of all it is necessary to provide the possibility of securing the plug to the structure forming the socket—as a rule, the installation space is highly limited, in particular in electric vehicles.

In view of the known prior art, the object of the present invention is to provide an improved clamping device in order to reduce or to suppress mechanical loadings of an electrical plug-in connection, for example mechanical loadings as a result of vibrations.

The present invention is also based on the object of providing an improved electrical plug-in connection of which the robustness with respect to mechanical loadings, in particular with respect to mechanical loadings as a result of vibrations, is increased.

For the clamping device, the object is achieved with the features disclosed herein including in the claims. With regard to the electrical plug-in connection, the object is achieved by the features disclosed herein, including in the claims.

The features described herein relate to advantageous embodiments and variants of the invention.

A clamping device for an electrical plug-in connection is provided. The electrical plug-in connection has an electrical plug-in connector, a mating electrical plug-in connector that can be electrically and mechanically connected to the plug-in connector, and a primary latching arrangement for latching the connection between the plug-in connector and the mating electrical plug-in connector.

The clamping device is designed to brace or to press the plug-in connector and the mating plug-in connector relative to one another in their connected state in addition to the latching by the primary latching arrangement.

Preferably, the clamping device is designed to brace the plug-in connector and the mating plug-in connector directly against one another in their connected state.

The fact that the plug-in connector and the mating plug-in connector are braced or pressed against one another means that the connection between the plug-in connector and the mating plug-in connector is mechanically stabilized. This can prevent the contacts of the plug-in connector and the mating contacts of the mating plug-in connector rubbing on one another as a result of mechanical loading, in particular as a result of vibrations. Abrasion of the contacts and mating contacts can consequently be avoided, as a result of which no persistent increase in the transfer impedance of the plug-in connection occurs. Furthermore, the service life of the plug-in connection is preferably increased.

Since, as opposed to the known prior art, the electrical plug-in connector is not braced relative to the assembly having the mating plug-in connector, for example a unit/electric motor, but, on the other hand, directly relative to the mating plug-in connector, the plug-in connection is in particular also advantageously suitable when the environment surrounding the plug-in connection is small and securing to surrounding structures is not possible.

Furthermore, the plug-in connection can be mechanically stabilized still further by the immediate bracing of the plug-in connector relative to the mating plug-in connector, since, as compared with the known prior art, the forces are led on short and direct paths directly between the plug-in connector and the mating plug-in connector.

In an advantageous development, provision can be made for the clamping device to have at least one clamping element, which is designed to interact with the mating plug-in connector in a form-fitting manner to brace the plug-in connector relative to the mating plug-in connector.

The clamping element can be designed, for example, to engage in a latching element of the plug-in connector and/or the mating plug-in connector in a form-fitting manner. For example, provision can be made for the clamping element to engage behind a corresponding projection of a plug-in connector housing and/or a mating plug-in connector housing.

Provision can be made for the clamping device to have at least two clamping elements, which are each designed to interact with the mating plug-in connector in a form-fitting manner to brace the plug-in connector relative to the mating plug-in connector. Preferably, in addition a third clamping element or even still more clamping elements, for example a fourth clamping element, a fifth clamping element, a sixth clamping element or still more clamping elements can be provided.

The clamping elements can preferably each be formed as separate components.

In a particularly advantageous development, provision can be made for the clamping device to have at least a first clamping leg and a second clamping leg. Preferably, in addition a third clamping leg or even still more clamping legs, for example a fourth clamping leg, a fifth clamping leg, a sixth clamping leg or still more clamping legs can be provided.

Preferably, the clamping leg or the clamping legs can each have or form one of the clamping elements at their first ends.

The clamping leg or the clamping legs can possibly also each form one of the clamping elements at both ends.

The clamping element and/or the clamping leg can, for example, have a recess, for example a groove or a cutout, in which a latching element of the plug-in connector and/or the mating plug-in connector is able to engage in a form-fitting manner (for example a corresponding projection of a plug-in connector housing and/or a mating plug-in connector housing).

Particularly preferably, the clamping element is, however, formed as a clamping head at the first end of the clamping leg. For this purpose, the clamping element can, for example, have a projection behind which a latching element of the plug-in connector and/or the mating plug-in connector is able to engage in a form-fitting manner (for example a latching hook or a corresponding projection of the plug-in connector housing and/or the mating plug-in connector housing).

The clamping legs and/or clamping elements can each be formed differently or identically.

In an advantageous development, provision can be made for the clamping legs each to be formed as separate components or for the respective second ends of the clamping legs to be connected to one another via a common connecting yoke.

It should be mentioned that the term "leg" or "clamping leg" in the present case is intended to be used substantially for naming the feature and in particular is not intended to indicate that two (or more) clamping legs are necessarily provided or that two or more clamping legs necessarily have to be connected to one another (via a connecting yoke).

For example only, and without limitation, all the clamping legs can be formed as components that are independent of or separate from one another. However, it is also possible for only one of the clamping legs or some of the clamping legs to be formed separately from the remaining clamping legs, the remaining clamping legs being formed in one piece. In addition, it is also possible for provision to be made of a plurality of groups of clamping legs which in each case form one or a plurality of one-piece clamping legs. For example, respectively two clamping legs can be formed in one piece.

The interconnected clamping legs or the one-piece clamping legs can preferably be connected to one another via the connecting yoke. In a preferred embodiment of the invention, all the clamping legs are connected to one another via the common connecting yoke.

Optionally, the connecting yoke according to a first variant of the invention can form a contact surface for contact with the plug-in connector and/or with the mating plug-in connector, in order to effect the bracing of the plug-in connector relative to the mating plug-in connector together with the clamping legs.

According to the first variant, provision can be made, for example, for all the clamping elements of the clamping legs to latch with the mating plug-in connector and for the connecting yoke to rest simultaneously on the plug-in connector. According to the first variant, provision can also be made, for example, for all the clamping elements of the clamping legs to latch with the plug-in connector and for the connecting yoke to rest simultaneously on the mating plug-in connector. Mixed latching of clamping elements in the plug-in connector, on the one hand, and in the mating plug-in connector, on the other hand, can also be provided.

According to a development of the invention, provision can be made for the first clamping leg and the second clamping leg to be arranged opposite one another along the connecting yoke, in order to engage around the plug-in connector and/or the mating plug-in connector in the manner of tongs.

Preferably, the first clamping leg and the second clamping leg and their clamping elements are formed identically.

Particularly preferably, the first clamping leg and the second clamping leg are designed and arranged to engage around the plug-in connector and the mating plug-in connector jointly in the manner of tongs or in the manner of a clamp and to interact in a form-fitting manner, for example to latch, with the mating plug-in connector with their clamping elements. According to the first variant of the invention, the connecting yoke can rest with its contact surface on the plug-in connector. Even in this way, advantageous bracing between the plug-in connector and the mating plug-in connector can be carried out. Alternatively, or additionally, however, the bracing can also be carried out in another way, for example as described below with respect to a second variant of the invention.

According to a development of the invention, provision can be made for the third clamping leg to be arranged in relation to the mutually opposite two clamping legs in such a way that the clamping elements of the clamping legs are positioned at the points of a common triangle in a top view, in order to engage around the plug-in connector and/or the mating plug-in connector on three side surfaces.

The clamping device can preferably be formed in the manner of a tripod. The clamping device can brace the plug-in connector relative to the mating plug-in connector by means of an advantageous 3-point support.

The connecting yoke can be formed, for example, with a T shape in a top view, wherein the first clamping leg and the second clamping leg are arranged at the opposite ends of the T-shaped connecting yoke, and the third clamping leg is arranged at the lower, third end of the T-shaped connecting yoke.

Particularly preferably, provision can be made for the first clamping leg and the second clamping leg to be formed and arranged to engage around the plug-in connector and the mating plug-in connector jointly in the manner of tongs and to interact, for example to latch, with the mating plug-in connector in a form-fitting manner with their clamping elements, wherein the third clamping leg likewise interacts with the mating plug-in connector in a form-fitting manner with its clamping element. The bracing between the plug-in connector and the mating plug-in connector can be improved even more by this "3-legged" configuration of the clamping device.

As already disclosed, still further clamping legs can optionally also be provided, for example a fourth clamping leg, which is arranged opposite the third clamping leg, or else still further clamping legs, for example also a plurality of clamping legs, which are able to act on the same side of the plug-in connector and mating plug-in connector.

For example, four clamping legs can be connected to one another via a cross-shaped common connecting yoke and engage around the plug-in connector and the mating plug-in connector on four sides. The cross-shaped connecting yoke can also be aligned in such a way that the clamping legs each act in the region of the edges connecting the sides of the plug-in connector or mating plug-in connector.

It is additionally also possible for respectively two clamping legs to be connected via a common connecting yoke in the manner of a clamp, wherein one, two or more "clamps" can then be used to brace the plug-in connector and the mating plug-in connector against one another.

Preferably, the clamping legs are arranged at the greatest possible distance from one another with a view to an optimized clamping action.

The clamping device is preferably formed in one piece but can possibly also be formed from many pieces. As already disclosed, for example, all or some of the clamping legs can be formed as independent components. In addition, the connecting yoke connecting the clamping legs can possibly be formed from a separate component.

The clamping device can preferably be made of a plastic. The clamping device can be made, for example, within the context of an injection molding process as a plastic injection molding. However, provision can also be made for the clamping device to be formed from a metal or at least to have metallic components.

The present invention also relates to an electrical plug-in connection having an electrical plug-in connector, a mating electrical plug-in connector that can be electrically and mechanically connected to the plug-in connector, a primary latching arrangement for latching the connection between the plug-in connector and the mating electrical plug-in connector, and a clamping device according to the embodiments disclosed herein (in particular a clamping device which is designed to brace the plug-in connector and the mating electrical plug-in connector relative to one another in their connected state in addition to the latching by way of the primary latching arrangement).

Advantageously, it is thus possible to provide a plug-in connection which is mechanically advantageously stabilized with respect to mechanical loadings, in particular vibrations, by means of bracing between the plug-in connector and the mating plug-in connector or between their respective housings.

As a result of the additional bracing of the plug-in connection at beneficial positions, forces and torques can be transmitted more directly between the plug-in connector and the mating plug-in connector. In this way, relative movements between the plug-in connector and the mating plug-in connector can be suppressed, and therefore also the loading of the contacts during the use of the plug-in connection (in particular so-called vibration wear, "fretting") can be reduced.

Advantageously, mechanical play between the plug-in connector and the mating plug-in connector can be reduced by the clamping device according to the present invention.

Features which have been described in conjunction with the clamping device according to the present invention can of course also be advantageously implemented for the electrical plug-in connection—and vice versa. Furthermore, advantages which have already been recited in conjunction with the clamping device according to the invention can also be understood to be based on the electrical plug-in connection—and vice versa.

The plug-in connector can have a plug-in connector housing. The mating plug-in connector can have a corresponding mating plug-in connector housing. The plug-in connector housing and/or the mating plug-in connector housing are preferably formed from a plastic, particularly preferably from a plastic injection molding.

The plug-in connector and/or the mating plug-in connector can have further, usual components of a plug-in connection, in particular contacts and corresponding mating contacts, an inner housing shell, a contact part carrier for receiving the contacts or mating contacts, supporting sleeves, compression or crimp sleeves, external conductor contact elements and/or means for electromagnetic shielding.

Provision can in particular be made for the clamping device to be a component independent of the primary latching arrangement.

In particular, if the clamping device is independent of the primary latching arrangement, the bracing force between the plug-in connector and the mating plug-in connector can be designed to be particularly high, since the plug-in connection can still be closed by a user of the plug-in connection without any excessive expenditure of force as a result of the primary latching arrangement. The smooth action of the primary latching arrangement is thus preferably not impaired by the bracing according to the invention.

Furthermore, the clamping device can act at particularly advantageous clamping positions independently of the primary latching arrangement.

Provision can be made for the clamping device to brace the plug-in connection in a force-fitting and form-fitting manner in several degrees of freedom. Preferably, the clamping device braces the plug-in connection in three degrees of rotational freedom and in two or three degrees of translational freedom.

Preferably, three clamping elements or clamping regions can be provided in order to mechanically brace the clamping device in three degrees of rotational freedom and in two degrees of translational freedom.

Particularly preferably, the plug-in connection is braced in all three degrees of rotational freedom and in all three degrees of translational freedom.

In an advantageous development of the invention, provision can be made for the plug-in connector and/or the mating plug-in connector to have latching elements which are designed to enter into a form fit with the clamping elements of the clamping device to brace the plug-in connector relative to the mating plug-in connector.

The latching elements are preferably projections or latching hooks in a plug-in connector housing of the plug-in connector and/or a mating plug-in connector housing of the mating plug-in connector. The projections or latching hooks can be designed to penetrate into corresponding recesses (for example grooves or cutouts) of the clamping elements of the clamping legs or else to engage behind the clamping elements—in particular when the clamping elements are formed as clamping heads.

In principle, provision can also be made for the latching elements to be formed as recesses in the plug-in connector housing or mating plug-in connector housing, into which corresponding projections of the clamping elements of the clamping legs, for example the clamping heads, are able to penetrate.

Particularly preferably, the mating plug-in connector has a first latching element, which is designed and arranged to form a form fit, or to latch with, a clamping element of the first clamping leg of the clamping device which is formed as a clamping head or clamping hook.

Furthermore, the mating plug-in connector can preferably have a second latching element, which is designed and arranged to form a form fit, or to latch with, a clamping element of the second clamping leg of the clamping device which is formed as a clamping head or clamping hook.

In addition, provision can be made for the mating plug-in connector to have a third latching element, which is designed and arranged to form a form fit, or to latch with, a clamping element of the third clamping leg of the clamping device which is formed as a clamping head or clamping hook.

The latching elements can alternatively or additionally also be formed on the plug-in connector. Optionally, still further latching elements of the plug-in connector and/or mating plug-in connector can additionally also be provided.

In a development of the invention, provision can be made for the plug-in connector to have supporting elements, which are designed to absorb a bracing force introduced by the clamping elements to brace the plug-in connector relative to the mating plug-in connector.

The supporting elements can, for example, form a contact surface for the clamping elements, in particular for the clamping heads, in order to introduce the bracing force.

As a result, the clamping elements can advantageously press against the supporting elements.

In a development of the invention, which may be designated as a second variant of the invention, provision can be made for respectively one of the clamping elements for introducing the bracing force to be arranged between one of the latching elements and one of the supporting elements.

The second variant of the invention is suitable in particular in combination with clamping elements formed as clamping heads. The clamping elements or the clamping heads can be arranged to brace the plug-in connector relative to the mating plug-in connector in each case in a form-fitting manner between an associated latching element of the mating plug-in connector and an associated supporting element of the plug-in connector. By means of suitable dimensioning of the distances and geometries, the clamping element or the clamping head ultimately attempts to drive the latching element and the supporting element further apart, which results in bracing of the plug-in connection.

The first variant and the second variant of the invention can advantageously be combined with one another or implemented on their own for one or more clamping legs. In principle, still further variants for bracing the plug-in connection can also be provided.

In a development of the invention, provision can be made for at least the first clamping leg and the second clamping leg of the clamping device to be designed to be partly or completely elastic, in such a way that the clamping legs are spread apart counter to an elastic restoring force when the clamping legs engage around the plug-in connector and/or the mating plug-in connector.

As a result of the elastic restoring force, a supplementary force-fitting connection along at least one further degree of translational freedom can advantageously be provided. The bracing between the plug-in connector and the mating plug-in connector can be improved further hereby.

In an advantageous development of the invention, provision can be made for the clamping device or the individual clamping legs of the clamping device, at least starting from a pre-mounting position, to be displaceable and/or pivotable into a bracing position, in which the clamping device or the clamping legs brace the plug-in connector and the mating plug-in connector relative to one another. Preferably, in the pre-mounting position the clamping device or the individual clamping legs is/are captively connected to the plug-in connector and/or to the mating plug-in connector.

The clamping device or the clamping legs can be connectable to the plug-in connector, for example along a mounting direction, preferably along a straight mounting direction, until at least the pre-mounting position is reached. Starting from the pre-mounting position, a mounting movement leading onward can preferably be provided, for example a further straight movement and, in addition, tilting/rotation of the clamping device or the clamping legs until the clamping device or the respective clamping leg has reached the bracing position.

The plug-in connector and/or the mating plug-in connector can have guide channels in order to guide the clamping device or a respective clamping leg until the pre-mounting position is reached and/or starting from the pre-mounting position onward into the bracing position. The guide channels can in particular be designed to guide the clamping legs of the clamping device. The guide channels can be formed only in the plug-in connector housing and/or in the mating plug-in connector housing but can also be formed by gaps or spacings between the plug-in connector housing and the mating plug-in connector housing when the plug-in connector is connected to the mating plug-in connector.

To close the plug-in connection, provision can be made firstly to secure the clamping device or the individual clamping legs to the plug-in connector in the pre-mounting position. The plug-in connection can then be connected to the mating plug-in connector in the usual way, for example by latching the primary latching arrangement. Finally, the clamping device or the clamping legs can be moved into the bracing position.

In an advantageous development of the invention, provision can be made for the plug-in connector to have a locking element and for the mating plug-in connector to have a corresponding receptacle for the locking element, in order to provide a supplementary form fit for the plug-in connection when the plug-in connector is connected to the mating plug-in connector.

To clamp the plug-in connection along a third translational degree of freedom, in particular a conically shaped locking element of the plug-in connector or the plug-in connector housing which can be inserted into a corresponding recess (e.g. a conical recess) in the mating plug-in connector or the mating plug-in connector housing- or vice versa—may be suitable.

In an advantageous refinement of the invention, provision can be made for the plug-in connection to have a sealing element, which is designed to seal off the connection between the plug-in connector and the mating plug-in connector.

A sealing element can be advantageous in particular to seal off the plug-in connection against environmental influences, in particular dust, dirt and liquids. An elastic sealing element, for example a rubber seal, is preferably provided.

In particular, an elastic sealing element generally leads to high mechanical play between the plug-in connector and the mating plug-in connector, which can be problematic with regard to the vibration resistance of the plug-in connection-above all when additional production tolerances are added. Accordingly, the invention is particularly advantageously suitable for use with a plug-in connection which has a sealing element.

In a development of the invention, provision can be made for the plug-in connection to have a securing element, which is designed to mechanically secure the primary latching arrangement in its state latching the plug-in connection.

By means of the securing element, it is possible to ensure that the electrical plug-in connector and the mating electrical plug-in connector are held securely in their plugged-together state, since a movement of the primary latching arrangement to unlock the mating electrical plug-in connector is blocked by the securing element. This principle is consequently also designated as "housing locking" or "connector position assurance" (CPA). The functioning of a CPA is in principle sufficiently well known, for which reason the technical details will not be discussed further here.

The clamping device or at least one of the clamping legs can preferably be formed in one piece with the securing element or mechanically or functionally connected to the securing element.

Advantageously, the clamping device, apart from bracing the plug-in connection, can thus also fulfil the function of a CPA at the same time. In this way, one component of the plug-in connection can possibly be saved.

According to a development of the invention, provision can be made for the primary latching arrangement to have a locking yoke in order to move the plug-in connection, starting from a pre-latching position, in which the plug-in connector is not connected or at least not completely connected to the mating plug-in connector, into a locking position, in which the plug-in connector is connected to the mating plug-in connector.

Locking yokes of this type have proven to be particularly suitable in particular for use with plug-in connections for high voltage engineering.

The locking yoke preferably has two side arms connected via an actuating yoke. The side arms can be connected to two opposite side surfaces of the plug-in connector so as to be rotatable about an axis of rotation. To this end, the side arms can preferably have a hole to accommodate a pin projecting out of the plug-in connector housing, in order to form the axis of rotation.

The side arms can form a slotted guide control arrangement with the mating plug-in connector. The side arms can preferably form a slotted guide of the slotted guide control arrangement for this purpose, in particular by means of an appropriate slot or a groove, in which a respective pin-shaped guide block of the mating plug-in connector housing is positively guided.

According to a development of the Invention, provision can also be made for the primary latching arrangement to have a bayonet catch and/or a screw connection and/or a latching rocker and/or a locking slide and/or a latching connection, in order to move the plug-in connection, starting from a pre-latching position, in which the plug-in connector is not connected or at least not fully connected to the mating plug-in connector, into a locking position, in which the plug-in connector is connected to the mating plug-in connector.

In principle, the structure of the primary latching arrangement does not necessarily matter. The clamping device according to the invention can be suitable for use with a plug-in connection having any desired primary latching arrangement, but preferably for use with a plug-in connection having a locking yoke.

In an advantageous refinement of the invention, provision can be made for the plug-in connection to have an electric connector leading onward, which can be electrically and mechanically connected, in particular screwed, to the plug-in connector and/or to the mating plug-in connector.

The electric connector leading onward can in turn be, for example, a plug, an integral plug, a socket, a coupling or an adapter.

The connector leading onward can in particular be mechanically stably connected, preferably firmly screwed, to the mating plug-in connector.

The plug-in connector, the mating plug-in connector and/or the connector leading onward can be connected to an electrical cable or to a wiring harness, in particular to a high-voltage line. Particularly preferably, the plug-in connector is formed as a cable plug connector.

The plug-in connector, the mating plug-in connector and/or the connector leading onward (preferably the mating plug-in connector and/or the connector leading onward) can be connected to an electrical assembly, for example to a unit, to an electric motor, to a control device, to a current and/or voltage converter or to a vehicle battery.

A frame part of the electrical assembly, for example an outer housing of the electrical assembly, can extend between the plug-in connector and the connector leading onward, preferably between the mating plug-in connector and the connector leading onward. The connector leading onward can thus particularly preferably be arranged within the electrical assembly and be connected to the electrical components of the electrical assembly. The mating plug-in connector is preferably arranged on the outer housing of the electrical assembly and thus formed as a device connector of the electrical assembly.

The cross-sectional profile of the plug-in connector or the plug-in connector housing and/or of the mating plug-in connector or the mating plug-in connector housing can be square, rectangular or cylindrical. In principle, the invention may be suitable for use with a plug-in connector (housing) or mating plug-in connector (housing) with any desired cross-sectional profile.

The plug-in connection according to the invention can be used particularly advantageously within a vehicle, in particular a motor vehicle. The term "vehicle" describes any means of locomotion, in particular vehicles on land, on water or in the air, also including space vehicles.

A particularly advantageous area of use is electrical mobility.

The plug-in connection according to the invention is, however, suitable for any desired applications within the whole of electrical engineering and is not to be understood as restricted to use in vehicle technology.

It should be pointed out that terms such as "comprising", "having" or "with" do not rule out any other features or steps. Furthermore, terms such as "a" or "the" which point to a single number of steps or features do not rule out a plurality of features or steps—and vice versa.

Designations such as "first" or "second", etc. are primarily used for reasons of distinguishability of respective device or method features and are not necessarily intended to indicate that features are mutually dependent or related to one another.

Furthermore, it should be emphasized that the values and parameters described here also include deviations or fluctuations of ±10% or less, preferably ±5% or less, more preferably ±1% or less and very particularly preferably ±0.1% or less of the respectively named value or parameter, provided that these deviations are not ruled out when the invention is implemented in practice. The statement of ranges by means of starting and end values also comprises all those values and fractions which are included by the respectively named range, in particular the starting and end values and a respective average.

If, within the context of the invention, mention is made of a "form fit", then it should be emphasized at this point that this does not necessarily mean a complete form fit with regard to all degrees of freedom or spatial directions but, instead, a form fit along one degree of freedom or one spatial direction may even be adequate.

Exemplary embodiments of the invention will be described in more detail below by using the FIGURES.

SUMMARY

An electrical plug-in connection and clamping device for an electrical plug-in connection generally provides an electrical plug-in connector; a mating electrical plug-in connector, a clamping device and a latching arrangement.

A principal aspect of the present invention is a clamping device for an electrical plug-in connection, which has an electrical plug-in connector, a mating electrical plug-in connector that can be electrically and mechanically connected to the plug-in connector, and a primary latching arrangement for latching the connection between the plug-in connector and the mating electrical plug-in connector, characterized in that the clamping device is designed to brace the plug-in connector and the mating electrical plug-in connector relative to one another in their connected state in addition to the latching by way of the primary latching arrangement.

A further aspect of the present invention is a clamping device characterized in that the clamping device has at least one clamping element, which is designed to interact with the mating plug-in connector in a form-fitting manner to brace the plug-in connector relative to the mating plug-in connector.

A further aspect of the present invention is a clamping device characterized in that the clamping device has at least two clamping elements, preferably three clamping elements, which are each designed to interact with the mating plug-in connector in a form-fitting manner to brace the plug-in connector relative to the mating plug-in connector.

A further aspect of the present invention is a clamping device characterized in that the clamping device has at least a first clamping leg and a second clamping leg, and preferably additionally a third clamping leg, at each of the first ends of which one of the clamping elements is formed.

A further aspect of the present invention is a clamping device characterized in that the clamping legs are each formed as separate components, or in that the respective second ends of the clamping legs are connected to one another via a common connecting yoke.

A further aspect of the present invention is a clamping device characterized in that the first clamping leg and the second clamping leg are arranged opposite one another along the connecting yoke, in order to engage around the plug-in connector and/or the mating plug-in connector in the manner of tongs.

A further aspect of the present invention is a clamping device characterized in that the third clamping leg is arranged in relation to the two clamping legs that are opposite to one another in such a way that the clamping elements of the clamping legs are positioned at the points of a common triangle (D) in a top view, in order to engage around the plug-in connector and/or the mating plug-in connector on three side surfaces.

A further aspect of the present invention is an electrical plug-in connection, having an electrical plug-in connector, a mating electrical plug-in connector that can be electrically and mechanically connected to the plug-in connector, a primary latching arrangement for latching the connection between the plug-in connector and the mating electrical plug-in connector, and a clamping device.

A further aspect of the present invention is an electrical plug-in connection characterized in that the clamping device braces the plug-in connection in a force-fitting and form-fitting manner in several degrees of freedom, preferably in three degrees of rotational freedom and in two degrees of translational freedom.

A further aspect of the present invention is an electrical plug-in connection characterized in that the mating plug-in connector has latching elements, which are designed to enter into a form fit with the clamping elements of the clamping device in order to brace the plug-in connector relative to the mating plug-in connector.

A further aspect of the present invention is an electrical plug-in connection characterized in that the plug-in connector has supporting elements, which are designed to absorb a bracing force introduced by the clamping elements in order to brace the plug-in connector relative to the mating plug-in connector.

A further aspect of the present invention is an electrical plug-in connection characterized in that respectively one of the clamping elements for introducing the bracing force is arranged between one of the latching elements and one of the supporting elements.

A further aspect of the present invention is an electrical plug-in connection characterized in that at least the first clamping leg and the second clamping leg of the clamping device are designed to be partly or completely elastic, in such a way that the clamping legs are spread apart counter to an elastic restoring force when the clamping legs engage around the plug-in connector and/or the mating plug-in connector.

A further aspect of the present invention is an electrical plug-in connection characterized in that the clamping device, at least starting from a pre-mounting position, in which the clamping device is preferably captively connected to the plug-in connector, is displaceable and/or pivotable into a bracing position, in which the clamping device braces the plug-in connector and the mating plug-in connector relative to one another.

A further aspect of the present invention is an electrical plug-in connection characterized in that the plug-in connector has a locking element and the mating plug-in connector has a corresponding receptacle for the locking element in order to provide an additional form fit for the plug-in connection when the plug-in connector is connected to the mating plug-in connector.

A still further aspect of the present invention is an electrical plug-in connection characterized in that a securing element is provided and is designed to secure the primary latching arrangement in its state latching the plug-in connection, wherein the clamping device is preferably formed in one piece with the securing element.

An even still further aspect of the present invention is an electrical plug-in connection characterized in that the primary latching arrangement has a locking yoke with two side arms connected via an actuating yoke, wherein the side arms are connected to two opposite side surfaces of the plug-in connector so as to be rotatable about an axis of rotation and form a slotted guide control arrangement with the mating plug-in connector; and/or has a bayonet catch; and/or has a screw connection; and/or has a latching rocker; and/or has a latching connection, in order to remove the plug-in connection, starting from a pre-latching position, in which the plug-in connector is not or at least not fully connected to the mating plug-in connector into a locking position in which the plug-in connector is connected to the mating plug-in connector.

These and other aspects of the present invention are more fully set forth and disclosed herein.

BRIEF DESCRIPTIONS OF THE FIGURES

The figures each show preferred exemplary embodiments, in which individual features of the present invention are illustrated in combination with one another. Features of one exemplary embodiment can also be implemented separately from the other features of the same exemplary embodiment and, accordingly, can be readily combined by a person skilled in the art to form further expedient combinations and sub-combinations comprising features from other exemplary embodiments.

In the FIGURES, functionally identical elements are provided with the same designations.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1:
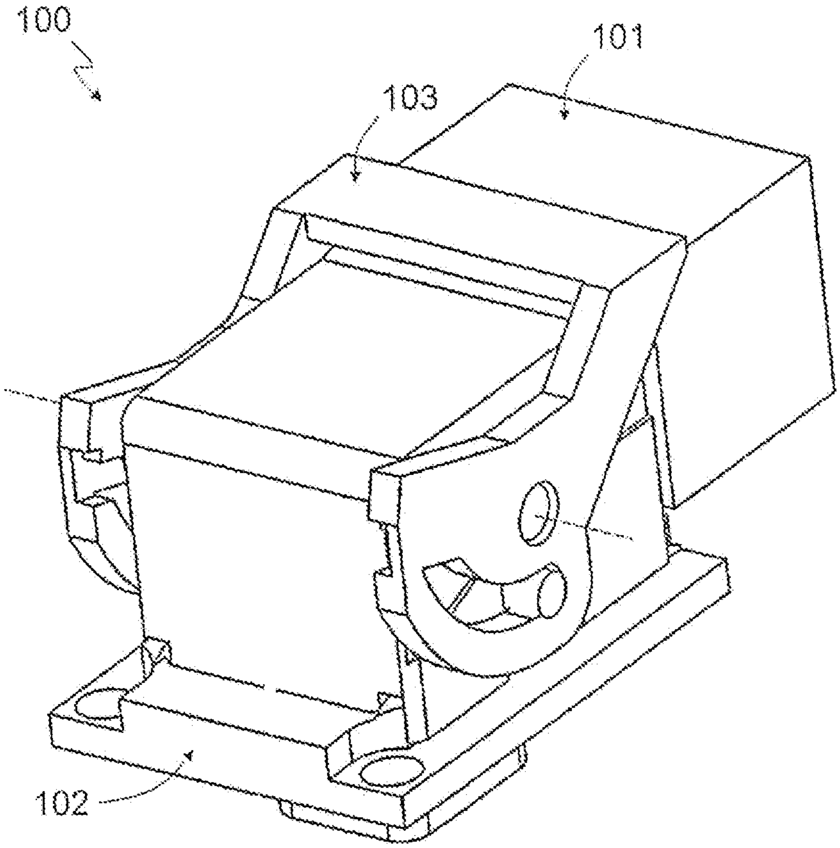
Fig. 1 PRIOR ART
FIG. 1 shows a perspective illustration of an electrical plug-in connection having a plug-in connector, a mating plug-in connector and a primary latching arrangement according to the prior art.

FIG. 1 shows an exemplary electrical plug-in connection 100 according to the prior art. The plug-in connection 100 has an electrical plug-in connector 101 and a mating electrical plug-in connector 102 that can be electrically and mechanically connected to the plug-in connector 101. The plug-in connection 100 additionally has a primary latching arrangement 103 for latching the connection between the plug-in connector 101 and the mating electrical plug-in connector 102.

The primary latching arrangement 103 is designed by way of example as a locking yoke, in order to move the plug-in connection 100, starting from a pre-latching position, in which the plug-in connector 101 is not connected or at least not fully connected to the mating plug-in connector 102, into a locking position, in which the plug-in connector 101 is connected to the mating plug-in connector 102. FIG. 1 shows the locked state of the plug-in connection 100.

During the use of the plug-in connection 100, from time to time mechanical loadings, in particular vibrations, can occur, which are transferred via the components connected to the plug-in connector 101 or to the mating plug-in connector 102, for example cables or electrical assemblies, to the plug-in connector 101 and the mating plug-in connector 102. As a result, abrasion of the contacts of the plug-in connector 101 and the mating contacts of the mating plug-in connector 102 can ultimately occur, which can have a detrimental effect on the transfer impedance and on the service life of the plug-in connection 100.

Although the primary latching arrangement 103 connects the plug-in connector 101 and the mating plug-in connector 102 securely and also firmly to one another as a rule, normally no plug-in connection 100 adequately stabilized against vibrations can be provided solely via the primary latching arrangement 103, in particular since the smooth action of the primary latching arrangement 103 must remain ensured for convenient operation of the plug-in connection 100.

FIGS. 2 to 17 show an electrical plug-in connection 1 according to the invention according to an exemplary embodiment of the invention. The plug-in connection 1 has an electrical plug-in connector 2 and a mating electrical plug-in connector 3 that can be electrically and mechanically connected to the plug-in connector 2 and also a primary latching arrangement 4 for latching the connection between the plug-in connector 2 and the mating electrical plug-in connector 3. In FIGS. 2 to 17, the internal components (for example the contacts and the mating contacts, etc.) of the plug-in connector 2 and of the mating plug-in connector 3 have been blanked out for simpler illustration; thus, in principle only the plug-in connector housing and the mating plug-in connector housing of the plug-in connector 2 and mating electrical plug-in connector 3 are illustrated.

In addition, the plug-in connection 1 according to the invention has a clamping device 5, which is designed to brace the plug-in connector 2 and the mating plug-in connector 3 in their connected state in addition to the latching by the primary latching arrangement 4. The clamping device 5 is a component that is independent of the primary latching arrangement 4.

By using the clamping device 5, the vibration resistance of the plug-in connection 1 can be increased, which means that the abrasion on the contacts and mating contacts of the plug-in connector 2 and of the mating plug-in connector 3 can be adequately avoided.

The electrical plug-in connection 1 illustrated in FIGS. 2 to 19 is preferably designed to transfer high currents at high voltages or as a high-voltage plug-in connection and is in particular advantageously suitable for use in vehicles, for example in electric vehicles. In principle, however, the plug-in connection 1 according to the invention may be suitable for any desired applications and the clamping device 5 according to the invention may be suitable for use with any desired plug-in connection 1. The plug-in connector types illustrated are to be understood as merely exemplary.

FIGS. 3 to 11 show the plug-in connection 1 in various views and individual illustrations.

Figure 9:
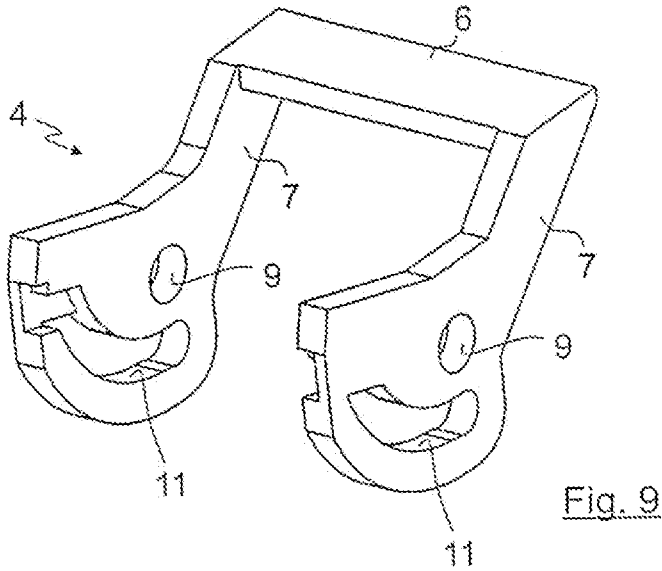
FIG. 9 shows a perspective individual illustration of the primary latching arrangement of the plug-in connection from FIG. 2.

The primary latching arrangement 4 of the plug-in connection 1, illustrated merely by way of example, is designed as a locking yoke having two side arms 7 connected via an actuating yoke 6 (cf. in particular the individual illustration in FIG. 9). By means of the locking yoke or the primary latching arrangement 4, the plug-in connection 1 can be moved, starting from a pre-latching position, not shown in the figures, in which the plug-in connector 2 is not or at least not fully connected to the mating plug-in connector 3, into a locking position and optionally latched there.

The side arms 7 are connected to two opposite side surfaces of the plug-in connector 2 so as to be rotatable about an axis of rotation A. The axis of rotation A is formed by two pins 8 projecting laterally out of the plug-in connector housing of the plug-in connector 2 (cf. in particular FIGS. 2 and 7), which are accommodated in a corresponding hole 9 in the respective side arm 7. The side arms 7 of the locking yoke additionally form a slotted guide control arrangement 10 with the mating plug-in connector 3 (cf. in particular FIG. 3). The slotted guide is formed in the side arms 7 by a corresponding longitudinal slot 11, in which a guide block 12 of the mating plug-in connector 3 is forcibly guided (cf. in particular FIGS. 5 and 6).

In principle, the primary latching arrangement 4 can also be designed in a manner deviating from the exemplary embodiment and, for example, have a bayonet catch, a screw connection, a latching rocker and/or a latching connection. The locking yoke is merely a particularly preferred embodiment of the primary latching arrangement 4, which may be highly suitable in particular for high-voltage plug-in connections.

Figure 10:
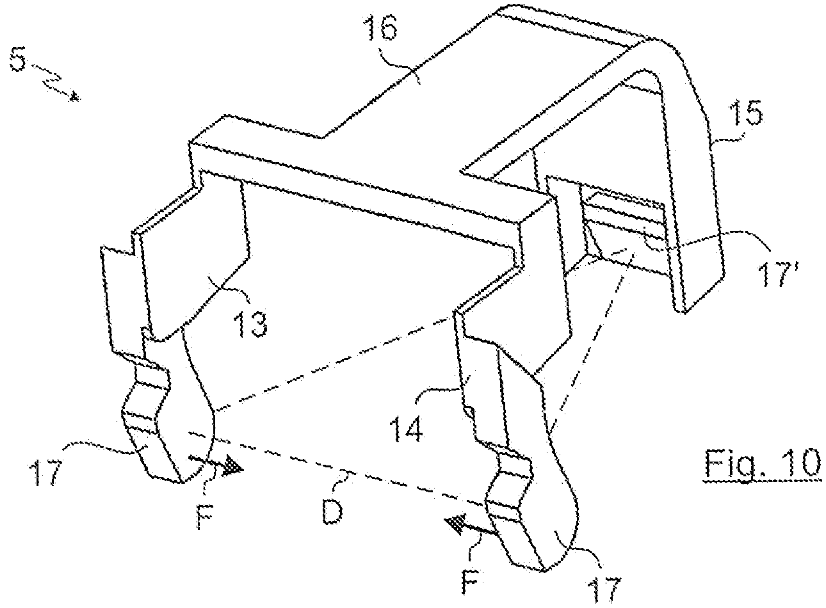
FIG. 10 shows a perspective individual illustration of the clamping device according to the invention of the plug-in connection from FIG. 2.
Figure 11:
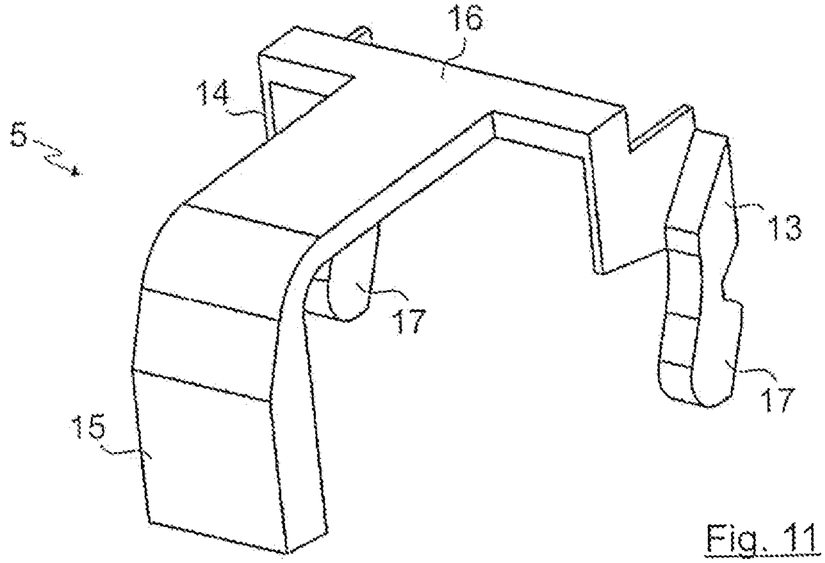
FIG. 11 shows a further perspective individual illustration of the clamping device according to the invention of the plug-in connection from FIG. 2.

FIGS. 10 and 11 show a clamping device 5 according to the invention in two perspective individual illustrations. The clamping device 5 has a first clamping leg 13, a second clamping leg 14 and a third clamping leg 15. In principle, in a simplified embodiment of the invention, the first clamping leg 13 and the second clamping leg 14 may also already be sufficient. Optionally, still further clamping legs can also be provided.

The clamping legs 13, 14, 15 are connected to one another by their respective second ends via a common connecting yoke 16. The connecting yoke 16 is T-shaped in a top view, wherein the first clamping leg 13 and the second clamping leg 14 are arranged on the opposite ends of the T-shaped connecting yoke 16, and the third clamping leg 15 is arranged on the lower, third end of the T-shaped connecting yoke 16.

At their first ends, the clamping legs 13, 14, 15 each have a clamping element 17, 17', which is designed to interact in a form-fitting manner with the plug-in connector 2 and with the mating plug-in connector 3 to brace the plug-in connector 2 with the mating plug-in connector 3. The clamping elements 17 of the first two clamping legs 13, 14 are formed by way of example as clamping heads and the clamping element 17' of the third clamping leg 15 is formed by way of example as a clamping hook.

Figure 2:
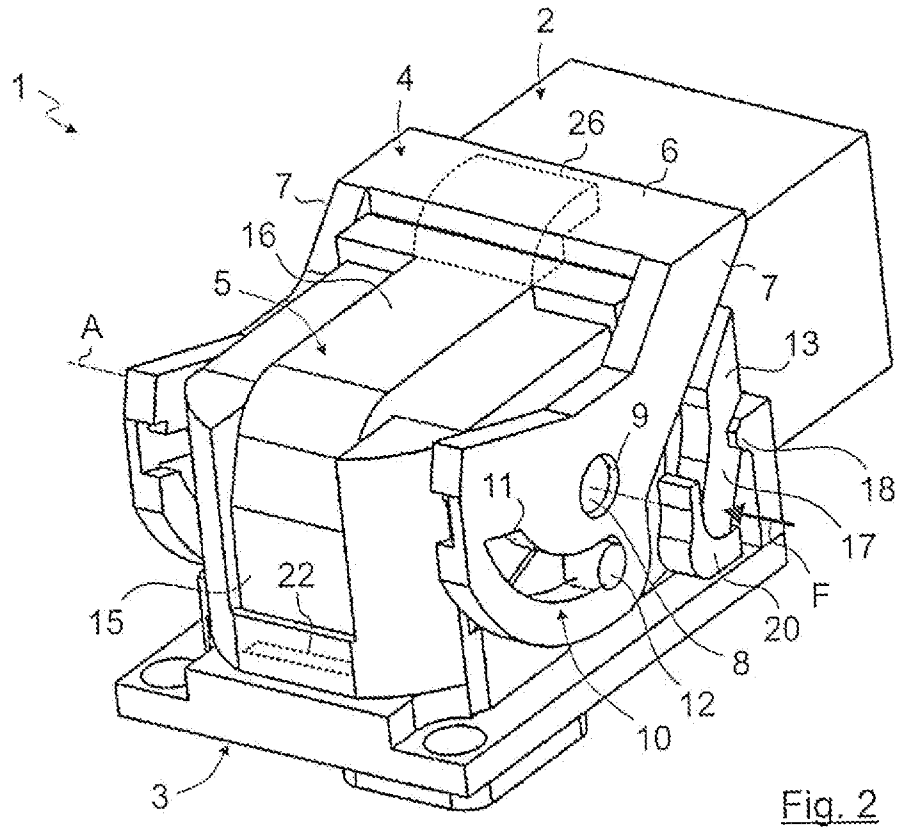
FIG. 2 shows a perspective illustration of an electrical plug-in connection according to the invention having a plug-in connector, a mating plug-in connector, a primary latching arrangement and a clamping device.
Figure 3:
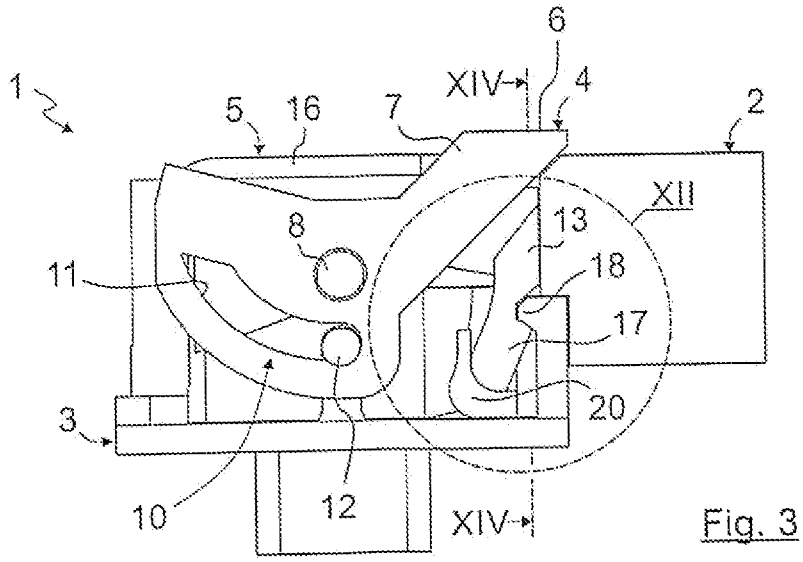
FIG. 3 shows a side view of the plug-in connection from FIG. 2.
Figure 4:
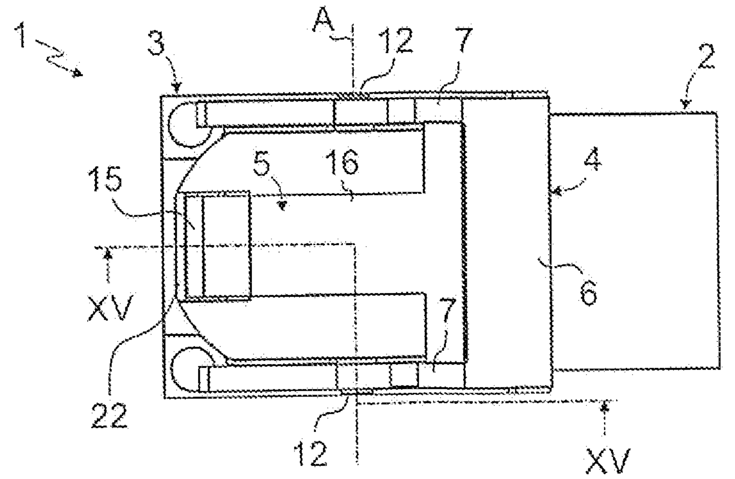
FIG. 4 shows a top plan view of the plug-in connection from FIG. 2.
Figure 5:
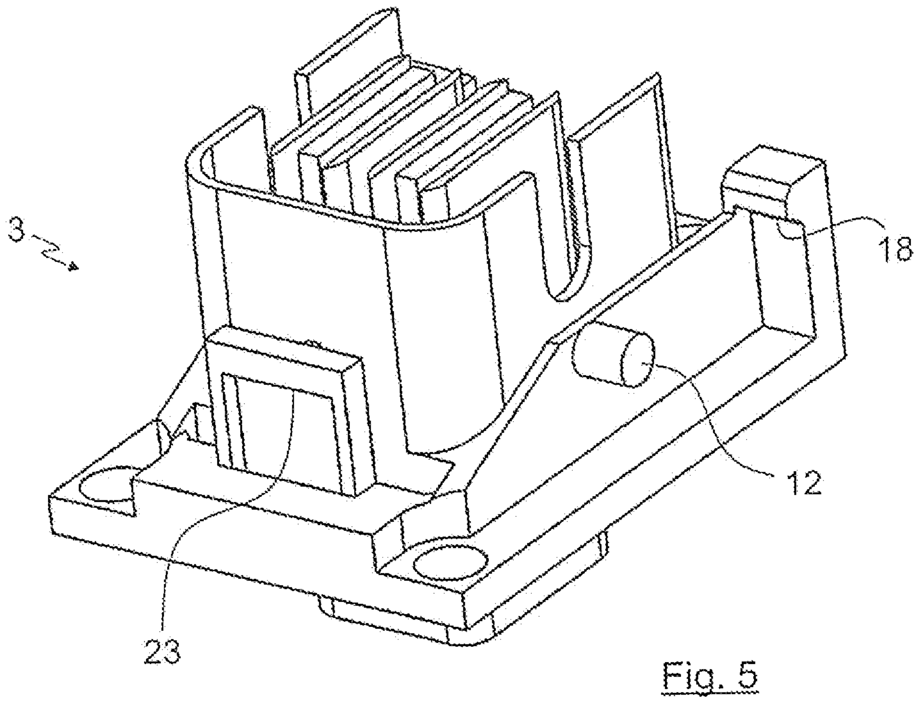
FIG. 5 shows a perspective individual Illustration of the mating plug-in connector of the plug-in connection from FIG. 2.

The first clamping leg 13 and the second clamping leg 14 are arranged opposite one another along the connecting yoke 16, in order to engage around the plug-in connector 2 and the mating plug-in connector 3 in the manner of tongs (cf. in particular FIG. 2). The third clamping leg 15 is arranged in relation to the two clamping legs 13, 14 that are opposite to one another in such a way that the clamping elements 17, 17' of all the clamping legs 13, 14, 15 are positioned at the points of a common triangle D in a top view (illustrated dashed in FIG. 10), in order to engage around the plug-in connector 2 and the mating plug-in connector 3 on three side surfaces, which can likewise be seen easily in FIG. 2.

Finally, the clamping device 5 is capable of bracing the plug-in connection 1 in a force-fitting and form-fitting manner in several degrees of freedom. Bracing in three degrees of rotational freedom and two degrees of translational freedom is already possible on account of the three clamping legs 13, 14, 15 having the respective clamping elements 17, 17".

Figure 12:
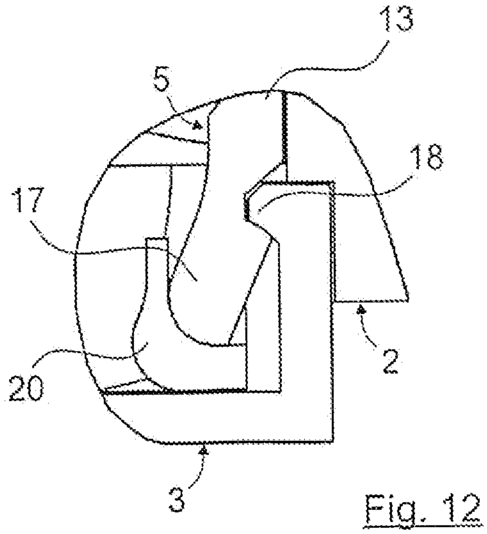
FIG. 12 shows a detailed view of identified portion XII of figure FIG. 3 to illustrate the bracing position of the clamping device, in which the clamping elements of the first clamping leg and of the second clamping leg are connected in a form-fitting manner to the first latching element and to the second latching element of the mating plug-in connector.
Figure 13:
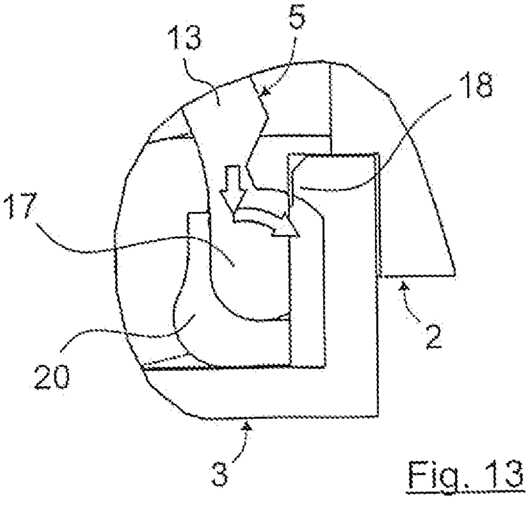
FIG. 13 shows an illustration corresponding to the detailed illustration of FIG. 12 with the clamping device in a pre-mounting position.

To brace the plug-in connection 1, the mating plug-in connector 3 has a first latching element 18 and a second latching element 19 (cf. in particular FIGS. 2, 5, 6), which correspondingly interact in a form-fitting manner with the clamping element 17 of the first clamping leg 13 and with the clamping element 17 of the second clamping leg 14, by the latching elements 18, 19 engaging behind the respective clamping head and the respective clamping element 17. By way of example, FIG. 3 and the enlarged detail in FIG. 12 show the form-fitting connection of the clamping element 17 of the first clamping leg 13, which is formed as a clamping head, with the first latching element 18 of the mating plug-in connector 3. The first clamping leg 13 (and also the second clamping leg 14) has, by way of example, a recess or a cutout behind the clamping head 17, into which a corresponding projection of the corresponding latching element 18, 19 is able to latch.

According to a first variant of the invention, provision can be made for the clamping device 5 to brace the plug-in connector 2 relative to the mating plug-in connector 3 in combination with the connecting yoke 16. For this purpose, the connecting yoke 16 can rest with a contact surface on the upper side of the plug-in connector 2.

However, the bracing can also be carried out independently of (or in addition to) the bracing by the connecting yoke 16. For the bracing, for example according to a preferred, second variant of the invention shown in the exemplary embodiments, provision can be made for the plug-in connector 2 to have supporting elements 20, 21, 22, which are designed to absorb a bracing force introduced by the clamping elements 17, 17' to brace the plug-in connector 2 relative to the mating plug-in connector 3. To introduce the bracing force, the clamping element 17 of the first clamping leg 13 is arranged between the first latching element 18 and a first supporting element 20 (cf. in particular FIG. 2) and, to introduce the bracing force, the clamping element 17 of the second clamping leg 14 is arranged between the second latching element 19 and a second supporting element 21. The first supporting element 20 and the second supporting element 21 are each formed approximately in an L-shape. The two supporting elements 20, 21 form a contact surface for the clamping elements 17 or for the clamping heads. The clamping elements 17 can advantageously press against the associated supporting elements 20, 21 as a result. To brace the plug-in connector 2 relative to the mating plug-in connector 3, the clamping elements 17 and the clamping heads are each arranged in a form-fitting manner between the latching element 18, 19 of the mating plug-in connector 3 that is assigned to them, and a supporting element 20, 21 of the plug-in connector 2 that is assigned to them. By means of suitable dimensioning of the distances and geometries, the clamping element 17 or the clamping head ultimately attempts to drive the associated latching element 18, 19 and the supporting element 20, 21 further apart, which results in bracing of the plug-in connection 1.

In order to improve the bracing still further, the mating plug-in connector 3 additionally has a third latching element 23 (cf. FIG. 5), which is designed to interact in a form-fitting manner with the clamping element 17' of the third clamping leg 15. The latching of the third latching element 23 with the clamping element 17' of the third clamping leg 15 is illustrated particularly well in the partial section of FIG. 15, which extends along the section line XV of FIG. 4. The clamping element 17' of the third clamping leg 15 is formed as a clamping hook by way of example. To introduce the bracing force, the clamping element 17' of the third clamping leg 15 is arranged between the third latching element 23 and a third supporting element 22 (cf. in particular FIG. 15). The third supporting element 22 forms a contact surface for the clamping element 17'. As a result, the clamping element 17' can advantageously press against the third supporting element 22, which results in the bracing of the plug-in connector 2 relative to the mating plug-in connector.

Optionally, provision can be made for at least the first clamping leg 13 and the second clamping leg 14 of the clamping device 5 to be partly or completely elastic, in such a way that the clamping legs 13, 14 are spread apart counter to an elastic restoring force F (cf. FIGS. 2 and 10) when the clamping legs 13, 14 engage around the plug-in connector 2 and the mating plug-in connector 3.

Figure 6:
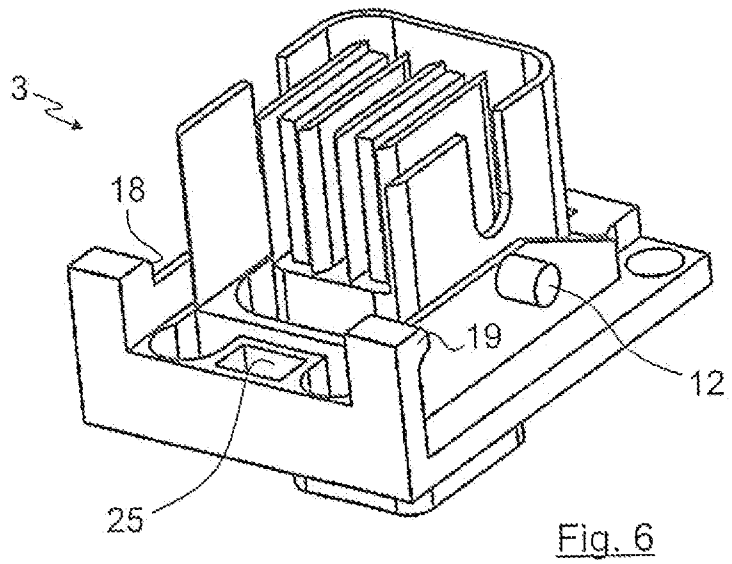
FIG. 6 shows a further perspective individual illustration of the mating plug-in connector of the plug-in connection from FIG. 2.
Figure 7:
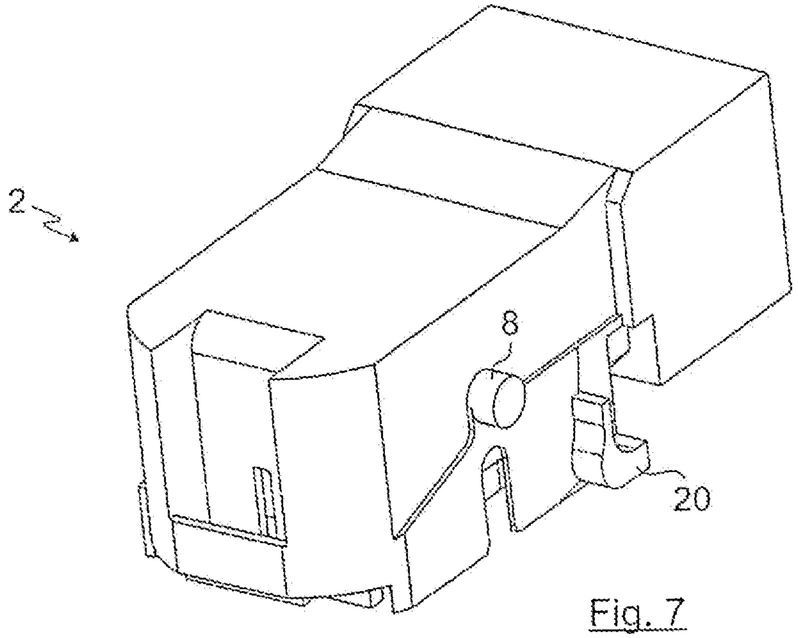
FIG. 7 shows a perspective individual illustration of the plug-in connector of the plug-in connection from FIG. 2.
Figure 8:
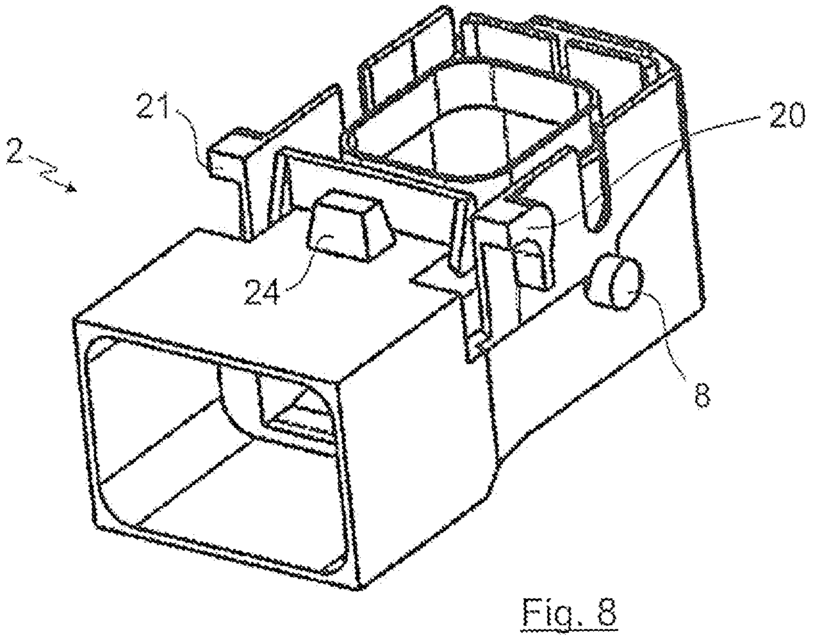
FIG. 8 shows a further perspective individual illustration of the plug-in connector of the plug-in connection from FIG. 2.
Figure 14:
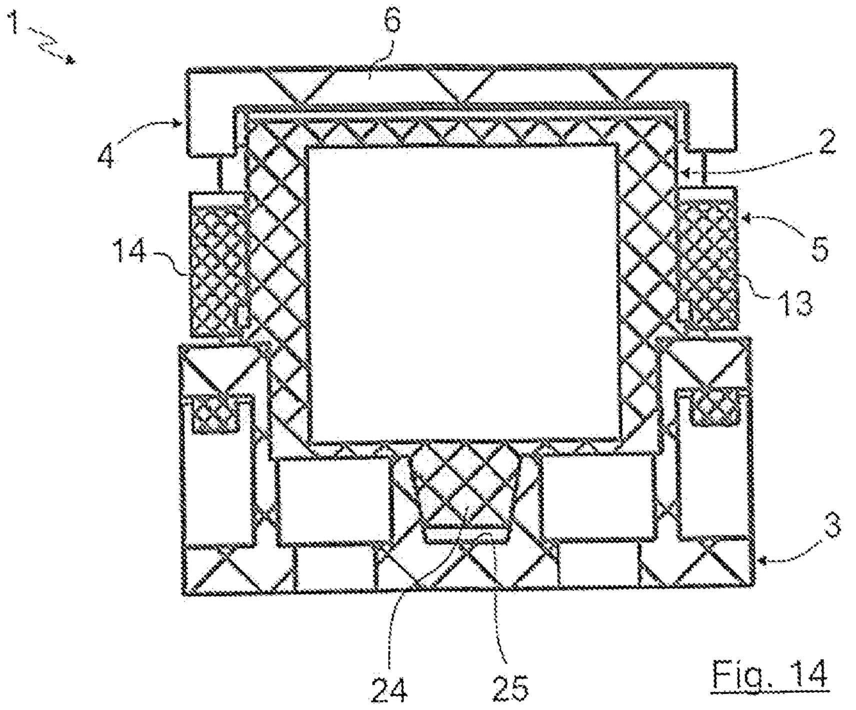
FIG. 14 shows a sectional illustration taken along the section line XIV of FIG. 3 to illustrate a locking element of the plug-in connector and a corresponding receptacle of the mating plug-in connector for an additional form fit.
Figure 15:
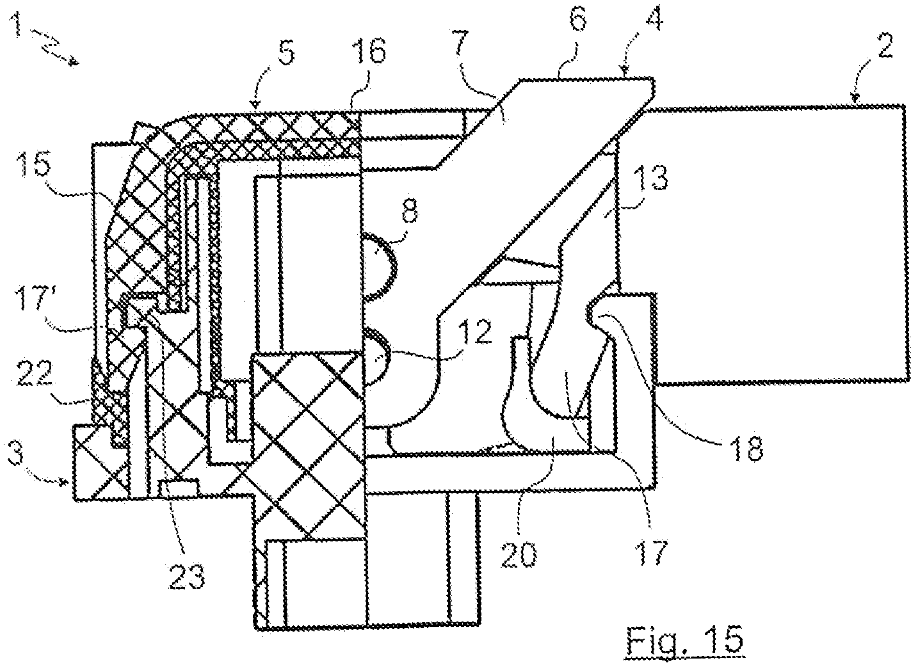
FIG. 15 shows a partially sectioned Illustration taken along the section line XV of the FIG. 4 to illustrate the clamping position of the clamping device, in which the clamping element of the third clamping leg is connected in a form-fitting manner to the third latching element of the mating plug-in connector.
Figure 16:
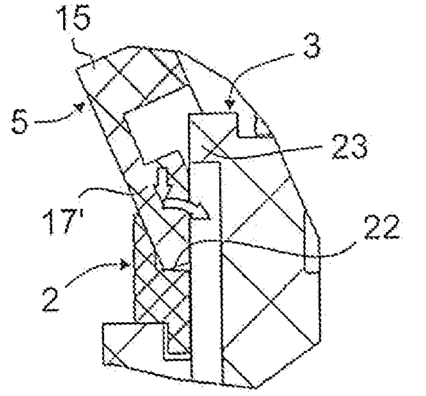
FIG. 16 shows a detail of the latching element of the plug-in connector and the clamping element of the third clamping leg with the clamping device in the pre-mounting position.

For an additional form fit for the plug-in connection 1, provision can additionally be made for the plug-in connector 2 to have a locking element 24 (cf. FIGS. 8 and 14) and for the mating plug-in connector 3 to have a corresponding receptacle 25 for the locking element 24 (cf. FIGS. 6 and 14). The connection of the locking element 24 to the receptacle 25 is illustrated particularly well by using the section along the section line XIV of FIG. 3 in FIG. 14.

Provision is preferably made for the clamping device 5, at least starting from a pre-mounting position (Illustrated in FIGS. 13 and 16), to be displaceable and/or pivotable into a bracing position (cf. for example FIGS. 12 and 15), in which the clamping device 5 braces the plug-in connector 2 and the mating plug-in connector 3 relative to one another. An example of a movement sequence for moving the clamping device 5, starting from the pre-mounting position, into the bracing position is indicated by appropriate arrows in FIGS. 13 and 16. In the pre-mounting position, the clamping device $ is preferably captively connected to the plug-in connector 2.

Optionally, the plug-in connection 1 can additionally have a securing element 26 (also known as "housing locking" or "connector position assurance, CPA"), which is designed to secure the primary latching arrangement 4 mechanically in its state locking the plug-in connection 1. Particularly preferably, the clamping device 5 is formed in one piece with the securing element 26 or at least mechanically and/or functionally connected to the securing element 26. Preferably, the clamping device 5 is therefore able to perform the function of the securing element 26 and also the bracing of the plug-in connection 1 equally well. A corresponding securing element 26 is indicated dashed in FIG. 2 in an exemplary, schematic manner.

To connect the plug-in connector 2 to the mating plug-in connector 3, provision can be made for the plug-in connector 2 with the pre-mounted clamping device 5 to be plugged together with the mating plug-in connector 3, after which the primary latching arrangement 4 is then latched. Finally, the optional securing element 26 can be moved into its securing position to secure the primary latching arrangement 4 and/or the clamping device 5 can be moved into its bracing position.

The plug-in connection 1 can preferably have a sealing element (not specifically illustrated in the figures), in order to seal off the connection between the plug-in connector 2 and the mating plug-in connector 3. The clamping device 5 according to the invention can be particularly advantageously suitable for use with a plug-in connection 1 having a sealing element, since such a plug-in connection 1 can generally be particularly susceptible to mechanical loading.

Figure 17:
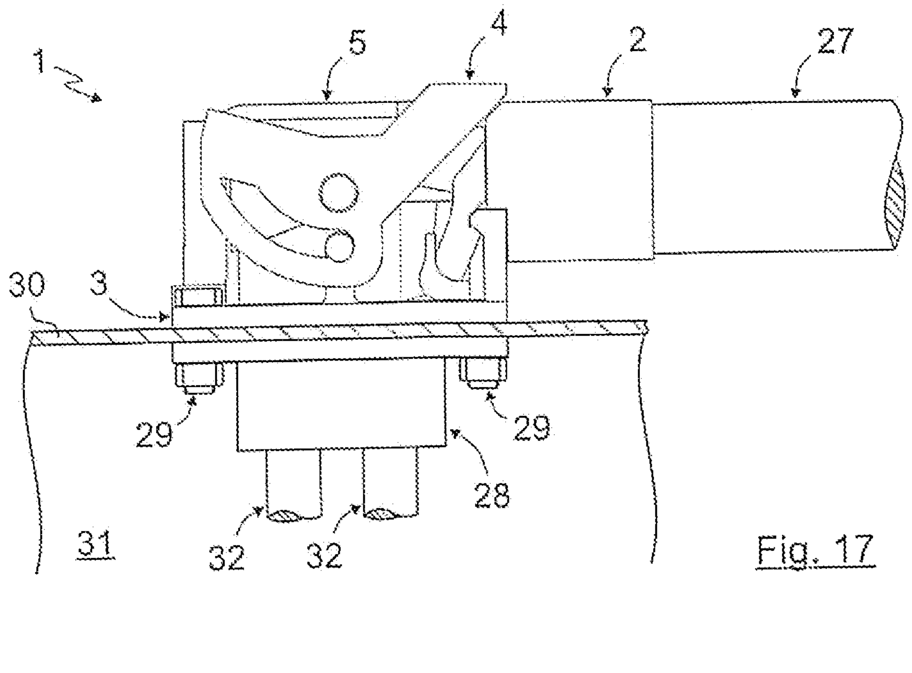
FIG. 17 shows the plug-in connection from FIG. 2 with an electrical connector leading further, an electrical cable and an electrical assembly.

FIG. 17 shows, by way of example, an advantageous use of the plug-in connection 1 according to the invention. The plug-In connection 1 is shown in its closed and secured and braced state.

The plug-in connector 2 is connected to an electrical cable 27 or a wiring harness. The mating plug-in connector 3 is connected to an electrical connector 28 leading onward and, for this purpose, by way of example is screwed to the connector 28 leading onward. Appropriate screws 29 are indicated in FIG. 17. Between the mating plug-in connector 3 and the connector 28 leading onward, a frame part or an outer housing 30 of an electrical assembly 31 is provided. The connector 28 leading onward is thus arranged on the inner wall of the outer housing 30 of the electrical assembly 31. The electrical assembly 31 can be, for example, a unit, an electric motor, a control device, a current or voltage converter, a vehicle battery or another electrical assembly. Starting from the connector 28 leading onward, appropriate lines 32 can run to the electrical components of the electrical assembly 31.

In principle, the mating plug-in connector 3 can, however, also be connected directly to an electrical cable 27 or another electrical component. For example, the plug-in connector 2 can also be connected to a connector 28 leading onward.

The application illustrated in FIG. 17 is to be understood as merely exemplary.

Figure 18:
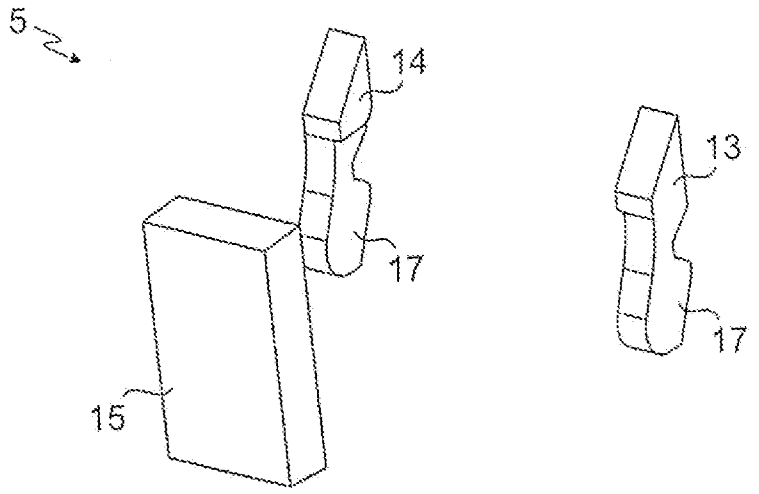
FIG. 18 shows a perspective individual illustration of a clamping device according to the invention having clamping legs which are each formed as separate components.

In addition, a perspective individual illustration of a clamping device 5 according to the invention having three clamping legs 13, 14, 15, which are each formed as separate components, is shown in FIG. 18. Bracing of the plug-in connection 1 according to the invention can thus advantageously also be implemented by the use of mutually independent clamping legs 13, 14, 15, in particular when the clamping elements 17, 17' for Introducing the bracing force are each introduced between one of the latching elements 18, 19, 23 and one of the supporting elements 20, 21, 22.

Figure 19:
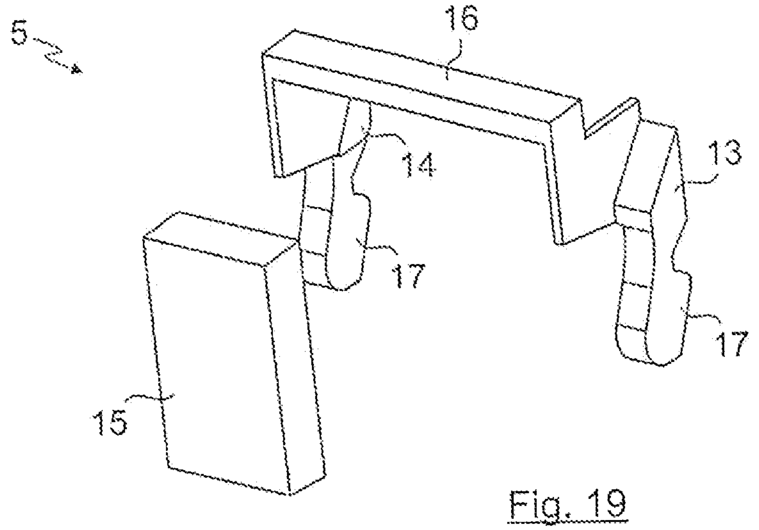
FIG. 19 shows a perspective individual illustration of a further clamping device according to the invention having two clamping legs connected via a common connecting yoke in the manner of a clamp and having a further, separate clamping leg.

In principle, for example, some of the clamping legs can also be connected to one another or formed in one piece with one another, while other clamping legs are formed as independent components. FIG. 19 shows, by way of example, a perspective individual illustration of a further clamping device 5 according to the invention, having two clamping legs 13, 14 connected via a common connecting yoke 16 in the manner of a clamp, and having a further, separate clamping leg 15.

Figure 20:
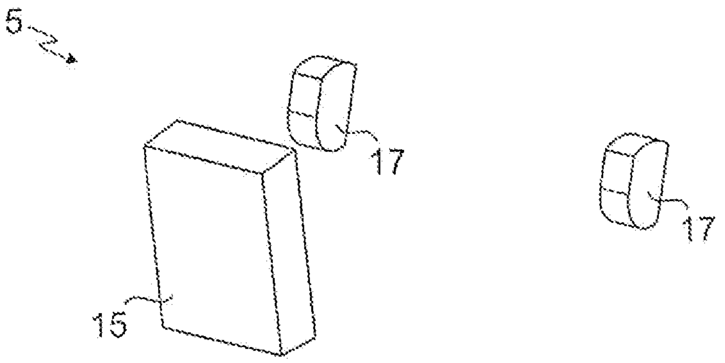
FIG. 20 shows a perspective individual illustration of a further clamping device according to the invention having one clamping leg and two separate clamping elements.

As already mentioned, within the context of the invention provision can also be made for individual or all the clamping elements 17, 17' to be used independently of a clamping leg 13, 14, 15. This is shown in the perspective individual illustration in FIG. 20 by way of example for the two clamping elements 17. The clamping elements 17 for introducing the bracing force can each be introduced between one of the latching elements 18, 19 and one of the supporting elements 20, 21. In principle, the clamping element 17' can also be used without a clamping leg 15; FIG. 20 is merely intended to illustrate a further variant of the invention by way of example.

Figure 21:
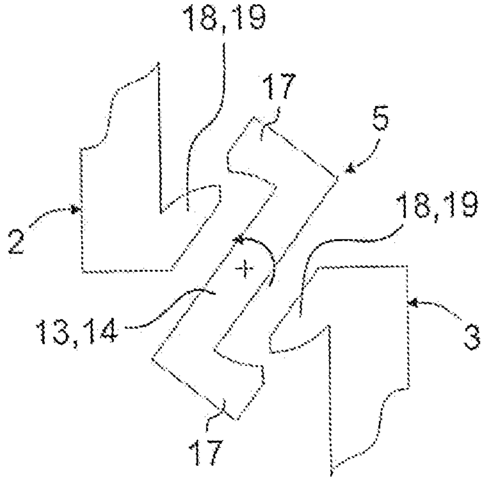
FIG. 21 shows a further clamping device according to the invention having one clamping leg, which has a clamping element at each of its two ends, in a pre-mounting position.
Figure 22:
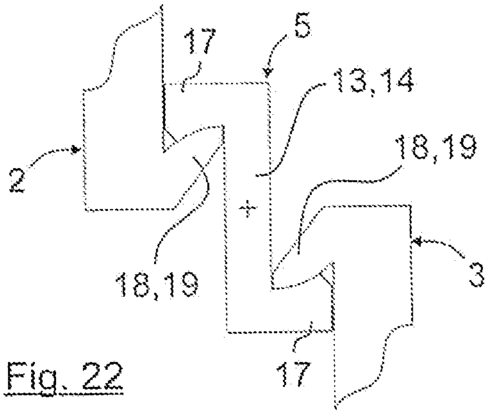
FIG. 22 shows the clamping device from FIG. 21 in the bracing position.

Finally, FIGS. 21 and 22 show a further exemplary embodiment of a clamping device 5 according to the invention. The functional principle is shown in a detail, merely by using the illustration of an individual clamping leg 13, 14 together with part of the plug-in connector 2 and the mating plug-in connector 3. FIG. 21 shows the clamping device 5 or the clamping leg 13, 14 in its pre-mounting position and FIG. 22 in its bracing position.

The clamping leg 13, 14 according to the exemplary embodiment of FIGS. 21 and 22 has a corresponding clamping element 17 on each of its two ends. The clamping element 17 is able to interact in a form-fitting manner with the latching element 18, 19 of the mating plug-in connector 3 in the bracing position. Furthermore, the plug-in connector 2 also has corresponding latching elements 18, 19.

The clamping leg 13, 14 can be rotatable along the axis of rotation marked in FIGS. 21 and 22, starting from the pre-mounting position into the bracing position. The clamping leg 13, 14 can be mounted so as to be rotatable along the axis of rotation on the plug-in connector 2 or on the mating plug-in connector 3; however this is not absolutely necessary.

Operation

Having described the structure of my electrical plug-in connection and clamping device for an electrical plug-in connection, its operation is briefly described.

A principal object of the present invention is an electrical plug-in connection (1) comprising: an electrical plug-in connector (2); a mating electrical plug-in connector (3) that can be electrically and mechanically connected to the electrical plug-in connector (2); a primary latching arrangement (4) for latching a connection between the electrical plug-in connector (2) and the mating electrical plug-in connector (3); and a clamping device (5) to brace the electrical plug-in connector (2) and the mating electrical plug-in connector (3) relative to one another in their connected state in addition to the latching by the primary latching arrangement (4); and wherein the clamping device (5) has a clamping element (17, 17'), designed to interact with the mating electrical plug-in connector (3) in a form-fitting manner to brace the electrical plug-in connector (2) relative to the mating electrical plug-in connector (3); and wherein the mating electrical plug-in connector (3) has a latching element (18, 19, 23), which enters into the form fit with the clamping element (17, 17') of the clamping device (5) to brace the electrical plug-in connector (2) relative to the mating electrical plug-in connector (3); and wherein the electrical plug-in connector (2) has a supporting element (20, 21, 22) to absorb a bracing force introduced by the clamping element (17, 17') to brace the electrical plug-in connector (2) relative to the mating electrical plug-in connector (3); and wherein the clamping element (17, 17') that introduces the bracing force is between the latching element (18, 19, 23) and the supporting element (20, 21, 22).

A further object of the present invention is an electrical plug-in connection (1) and wherein, the clamping device (5) has plural clamping elements (17, 17'), and wherein each of the plural clamping elements (17, 17') is designed to interact with the mating electrical plug-in connector (3) in a form-fitting manner to brace the electrical plug-in connector (2) relative to the mating electrical plug-in connector (3).

A further object of the present invention is an electrical plug-in connection (1) and wherein the clamping device (5) has a first clamping leg (13) which forms a first clamping element (17) at a first end, and a second clamping leg is forms a second clamping element (17') at a first end.

A further object of the present invention is an—electrical plug-in connection (1) and wherein the clamping legs (13) are each formed as separate components.

A further object of the present invention is an—electrical plug-in connection (1) and wherein the first clamping leg (13) and the second clamping leg (14) are arranged opposite one another along the common connecting yoke (16), in order to engage around the electrical plug-in connector (2) and/or around the mating electrical plug-in connector (3) in a manner of tongs.

A further object of the present invention is an electrical plug-in connection (1) and further comprising: a third clamping leg (15) arranged in relation to the first and second clamping legs (13, 14) so that the clamping elements (17, 17') of the clamping legs (13, 14, 15) are positioned at points of a common triangle (D) in a top view, so as to engage around the electrical plug-in connector (2) and/or around the mating electrical plug-in connector (3) on three side surfaces.

A further object of the present invention is an electrical plug-in connection (1) and wherein the clamping device (5) braces the electrical plug-in connection (1) in a force-fitting and form-fitting manner in plural degrees of freedom.

A further object of the present invention is an electrical plug-in connection (1) and further comprising: a clamping leg (13) of the clamping device (5), and the clamping leg (13) is at least partially elastic, in such a way that the clamping leq (13) is able to be spread apart counter to an elastic restoring force when the clamping leg (13) engages the electrical plug-in connector (2) and/or the mating electrical plug-in connector (3).

A further object of the present invention is an electrical plug-in connection (1) and wherein the clamping device(S), at least starting from a pre-mounting position, in which the clamping device (5) is preferably captively connected to the electrical plug-in connector (2), is displaceable into a bracing position, in which the clamping device (5) braces the electrical plug-in connector (2) and the mating electrical plug-in connector (3) relative to one another.

A further object of the present invention is an electrical plug-in connection (1) and further comprising: a locking element (24) on the electrical plug-in connector (2); and a corresponding receptacle (25) integral with the mating electrical plug-in connector (3) for the locking element (24) to provide an additional form fit for the electrical plug-in connection (1) when the electrical plug-in connector (2) is connected to the mating electrical plug-in connector (3).

A further object of the present invention is an electrical plug-in connection (1) and further comprising a securing element (23) that is integral with the clamping device (5); and wherein the securing element (23) secures the primary latching arrangement (4) in a state latching the electrical plug-in connection (1).

A further object of the present invention is an electrical plug-in connection (1) and further comprising: a locking yoke on the primary latching arrangement (4) and the locking yoke has two side arms (7) connected via an actuating yoke (6), and wherein the two side arms (7) of the locking yoke are connected to two opposite side surfaces of the electrical plug-in connector (2) so as to be rotatable about an axis of rotation (A) and form a slotted guide control arrangement (10) with the mating electrical plug-in connector (3) in order to reposition the electrical plug-in connection (1), starting from a pre-latching position, in which the electrical plug-in connector (2) is not fully connected to the mating electrical plug-in connector (3), into a locking position, in which the electrical plug-in connector (2) is connected to the mating electrical plug-in connector (3).

A further object of the present invention is an electrical plug-in connection as claimed in claim 4 and further comprising: a third clamping leg (15) which forms a third clamping element at a first end.

A further object of the present invention is an electrical plug-in connection (1) as claimed in claim 4 and further comprising: a common connecting yoke (16) that interconnects seconds ends of the plural clamping legs (13, 14, 15).

A further object of the present invention is an electrical plug-in connection (1) as claimed in claim 18 and wherein the clamping device (5) braces the electrical plug-in connection (1) in a force-fitting and form-fitting manner in three degrees of rotational freedom, and in two degrees of translational freedom.

A further object of the present invention is an electrical plug-in connection (1) as claimed in claim 18 and further comprising: a first clamping leg (13) and a second clamping leg (14) of the clamping device (5); and the first and second clamping legs (13, 14) are each at least partially elastic, in such a way that the first and second clamping legs (13, 14) are able to be spread counter to an elastic restoring force when the first and second clamping legs (13, 14) engage around the electrical plug-in connector (2) and/or around the mating electrical plug-in connector (3).

A further object of the present invention is an electrical plug-in connection (1) as claimed in claim 18 and further comprising: a bayonet catch on the primary latching arrangement (4) in order to reposition the electrical plug-in connection (1), starting from a pre-latching position, in which the electrical plug-in connector (2) is not fully connected to the mating electrical plug-in connector (3), into a locking position, in which the electrical plug-in connector (2) is connected to the mating electrical plug-in connector (3).

A further object of the present invention is an electrical plug-in connection (1) as claimed in claim 18 and further comprising: a screw connection on the primary latching arrangement (4) in order to reposition the electrical plug-in connection (1), starting from a pre-latching position, in which the electrical plug-in connector (2) is not fully connected to the mating electrical plug-in connector (3), into a locking position, in which the electrical plug-in connector (2) is connected to the mating electrical plug-in connector (3).

A further object of the present invention is an electrical plug-in connection (1) as claimed in claim 18 and further comprising: a latching rocker on the primary latching arrangement (4) in order to reposition the electrical plug-in connection (1), starting from a pre-latching position, in which the electrical plug-in connector (2) is not fully connected to the mating electrical plug-in connector (3), into a locking position, in which the electrical plug-in connector (2) is connected to the mating electrical plug-in connector (3).

A still further object of the present invention is an electrical plug-in connection (1) as claimed in claim 18 and further comprising: a latching connection on the primary latching arrangement (4) in order to reposition the electrical plug-in connection (1), starting from a pre-latching position, in which the electrical plug-in connector (2) is not fully connected to the mating electrical plug-in connector (3), into a locking position, in which the electrical plug-in connector (2) is connected to the mating electrical plug-in connector (3).

An even still further object of the present invention is an electrical plug-in connection (1) as claimed in claim 19 and further comprising: a common connecting yoke (16) that interconnects seconds ends of the plural clamping legs (13, 14, 15).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is therefore, claimed in any of its forms or modifications within the proper scope of the appended claims appropriately Interpreted in accordance with the Doctrine of Equivalents.

The invention claimed is:

1. An electrical plug-in connection comprising:

an electrical plug-in connector;

a mating electrical plug-in connector that can be electrically and mechanically connected to the electrical plug-in connector;

a primary latching arrangement for latching a connection between the electrical plug-in connector and the mating electrical plug-in connector; and a clamping device to brace the electrical plug-in connector and the mating electrical plug-in connector relative to one another in their connected state in addition to the latching by the primary latching arrangement; and wherein the clamping device has a clamping element, designed to interact with the mating electrical plug-in connector in a form-fitting manner to brace the electrical plug-in connector relative to the mating electrical plug-in connector; and wherein the mating electrical plug-in connector has a latching element, which enters into the form fit with the clamping element of the clamping device to brace the electrical plug-in connector relative to the mating electrical plug-in connector; and wherein the electrical plug-in connector has a supporting element to absorb a bracing force introduced by the clamping element to brace the electrical plug-in connector relative to the mating electrical plug-in connector; and wherein the clamping element that introduces the bracing force is between the latching element and the supporting element.

2. The electrical plug-in connection as claimed in claim 1 and wherein, the clamping device has plural clamping elements and wherein each of the plural clamping elements is designed to interact with the mating electrical plug-in connector in a form-fitting manner to brace the electrical plug-in connector relative to the mating electrical plug-in connector.

3. The electrical plug-in connection as claimed in claim 1 and wherein the clamping device has a first clamping leg which forms a first clamping element at a first end, and a second clamping leg forms a second clamping element at a first end.

4. The electrical plug-in connection as claimed in claim 3 and wherein the clamping legs are each formed as separate components.

5. The electrical plug-in connection as claimed in claim 3 and further comprising:

a third clamping leg which forms a third clamping element at a first end.

6. The electrical plug-in connection as claimed in claim 5 and further comprising:

the third clamping leg arranged in relation to the first and second clamping legs so that the clamping elements of the clamping legs are positioned at points of a common triangle (D) in a top view, so as to engage around the electrical plug-in connector and/or around the mating electrical plug-in connector on three side surfaces.

7. The electrical plug-in connection as claimed in claim 5 and further comprising:

a common connecting yoke that interconnects second ends of the plural clamping legs.

8. The electrical plug-in connection as claimed in claim 3 and further comprising:

a common connecting yoke that interconnects second ends of the plural clamping legs.

9. The electrical plug-in connection as claimed in claim 8 and wherein the first clamping leg and the second clamping leg are arranged opposite one another along the common connecting yoke, in order to engage around the electrical plug-in connector and/or around the mating electrical plug-in connector in a manner of tongs.

10. The electrical plug-in connection as claimed in claim 1 and wherein the clamping device braces the electrical plug-in connection in a force-fitting and form-fitting manner in plural degrees of freedom.

11. The electrical plug-in connection as claimed in claim 1 and further comprising:

a clamping leg of the clamping device, and the clamping leg is at least partially elastic, in such a way that the clamping leg is able to be spread apart counter to an elastic restoring force when the clamping leg engages the electrical plug-in connector and/or the mating electrical plug-in connector.

12. The electrical plug-in connection as claimed in claim 1 and wherein the clamping device, at least starting from a pre-mounting position, in which the clamping device is preferably captively connected to the electrical plug-in connector, is displaceable into a bracing position, in which the clamping device braces the electrical plug-in connector and the mating electrical plug-in connector relative to one another.

13. The electrical plug-in connection as claimed in claim 1 and further comprising:

a locking element on the electrical plug-in connector; and a corresponding receptacle integral with the mating electrical plug-in connector for the locking element to provide an additional form fit for the electrical plug-in connection when the electrical plug-in connector is connected to the mating electrical plug-in connector.

14. The electrical plug-in connection as claimed in claim 1 and further comprising:

a securing element that is integral with the clamping device; and wherein the securing element secures the primary latching arrangement in a state latching the electrical plug-in connection.

15. The electrical plug-in connection as claimed in claim 1 and further comprising:

a locking yoke on the primary latching arrangement and the locking yoke has two side arms connected via an actuating yoke, and wherein the two side arms of the locking yoke are connected to two opposite side surfaces of the electrical plug-in connector so as to be rotatable about an axis of rotation (A) and form a slotted guide control arrangement with the mating electrical plug-in connector in order to reposition the electrical plug-in connection, starting from a pre-latching position, in which the electrical plug-in connector is not fully connected to the mating electrical plug-in connector, into a locking position, in which the electrical plug-in connector is connected to the mating electrical plug-in connector.

16. The electrical plug-in connection as claimed in claim 1 and wherein the clamping device braces the electrical plug-in connection in a force-fitting and form-fitting manner in three degrees of rotational freedom, and in two degrees of translational freedom.

17. The electrical plug-in connection as claimed in claim 1 and further comprising:

a first clamping leg and a second clamping leg of the clamping device; and the first and second clamping legs are each at least partially elastic, in such a way that the first and second clamping legs are able to be spread counter to an elastic restoring force when the first and second clamping legs engage around the electrical plug-in connector and/or around the mating electrical plug-in connector.

18. The electrical plug-in connection as claimed in claim 1 and further comprising:

a bayonet catch on the primary latching arrangement in order to reposition the electrical plug-in connection, starting from a pre-latching position, in which the electrical plug-in connector is not fully connected to the mating electrical plug-in connector, into a locking position, in which the electrical plug-in connector is connected to the mating electrical plug-in connector.

19. The electrical plug-in connection as claimed in claim 1 and further comprising:

a screw connection on the primary latching arrangement in order to reposition the electrical plug-in connection, starting from a pre-latching position, in which the electrical plug-in connector is not fully connected to the mating electrical plug-in connector, into a locking position, in which the electrical plug-in connector is connected to the mating electrical plug-in connector.

20. The electrical plug-in connection as claimed in claim 1 and further comprising:

a latching rocker on the primary latching arrangement in order to reposition the electrical plug-in connection, starting from a pre-latching position, in which the electrical plug-in connector is not fully connected to the mating electrical plug-in connector, into a locking position, in which the electrical plug-in connector is connected to the mating electrical plug-in connector.

21. The electrical plug-in connection as claimed in claim 1 and further comprising:

a latching connection on the primary latching arrangement in order to reposition the electrical plug-in connection, starting from a pre-latching position, in which the electrical plug-in connector is not fully connected to the mating electrical plug-in connector, into a locking position, in which the electrical plug-in connector is connected to the mating electrical plug-in connector.

* * * * *